Sept. 2, 1930.   C. L. ROCKWELL   1,774,726
AIRPLANE CONSTRUCTION
Filed Feb. 23, 1929    3 Sheets-Sheet 1
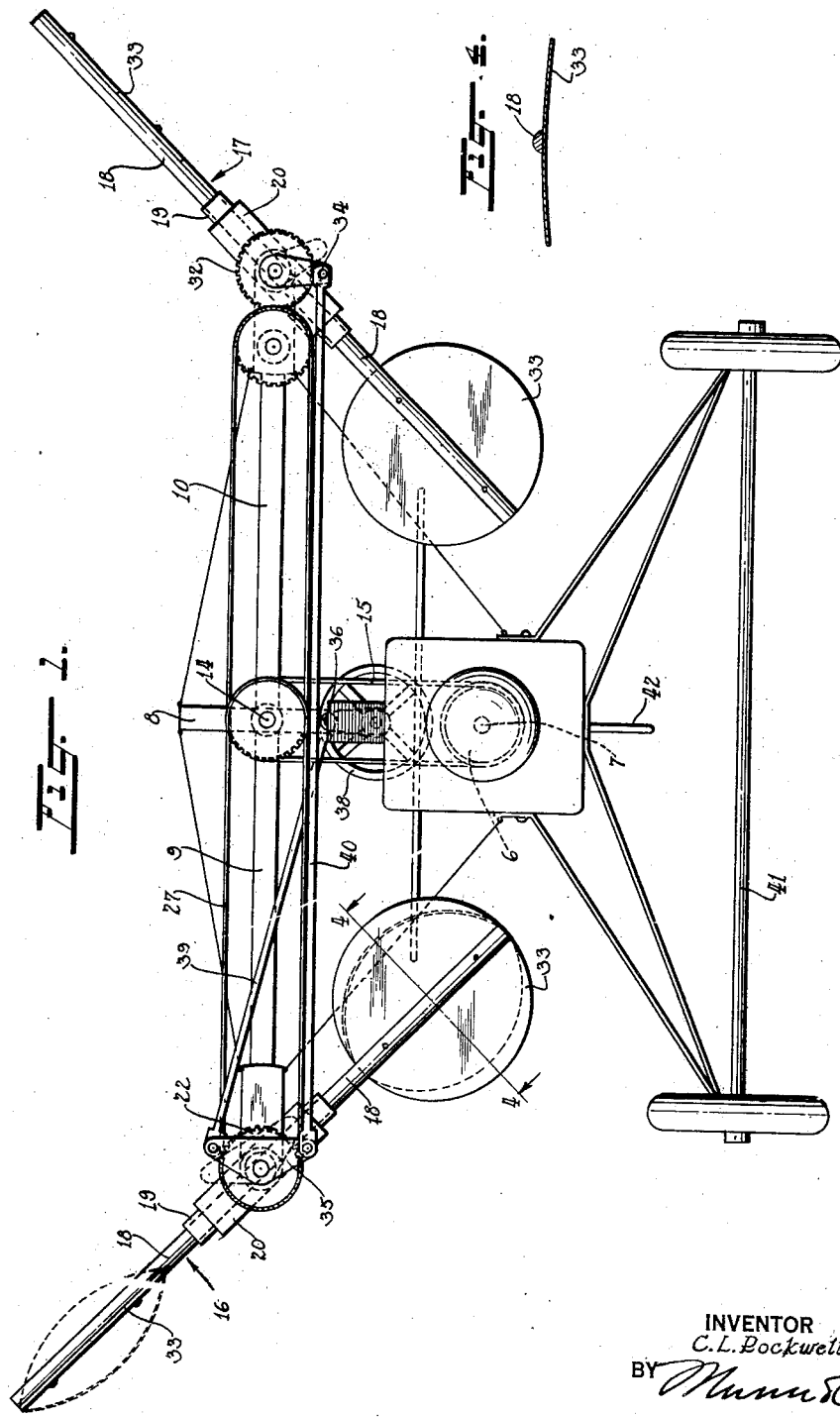
INVENTOR
C. L. Rockwell
BY
ATTORNEYS

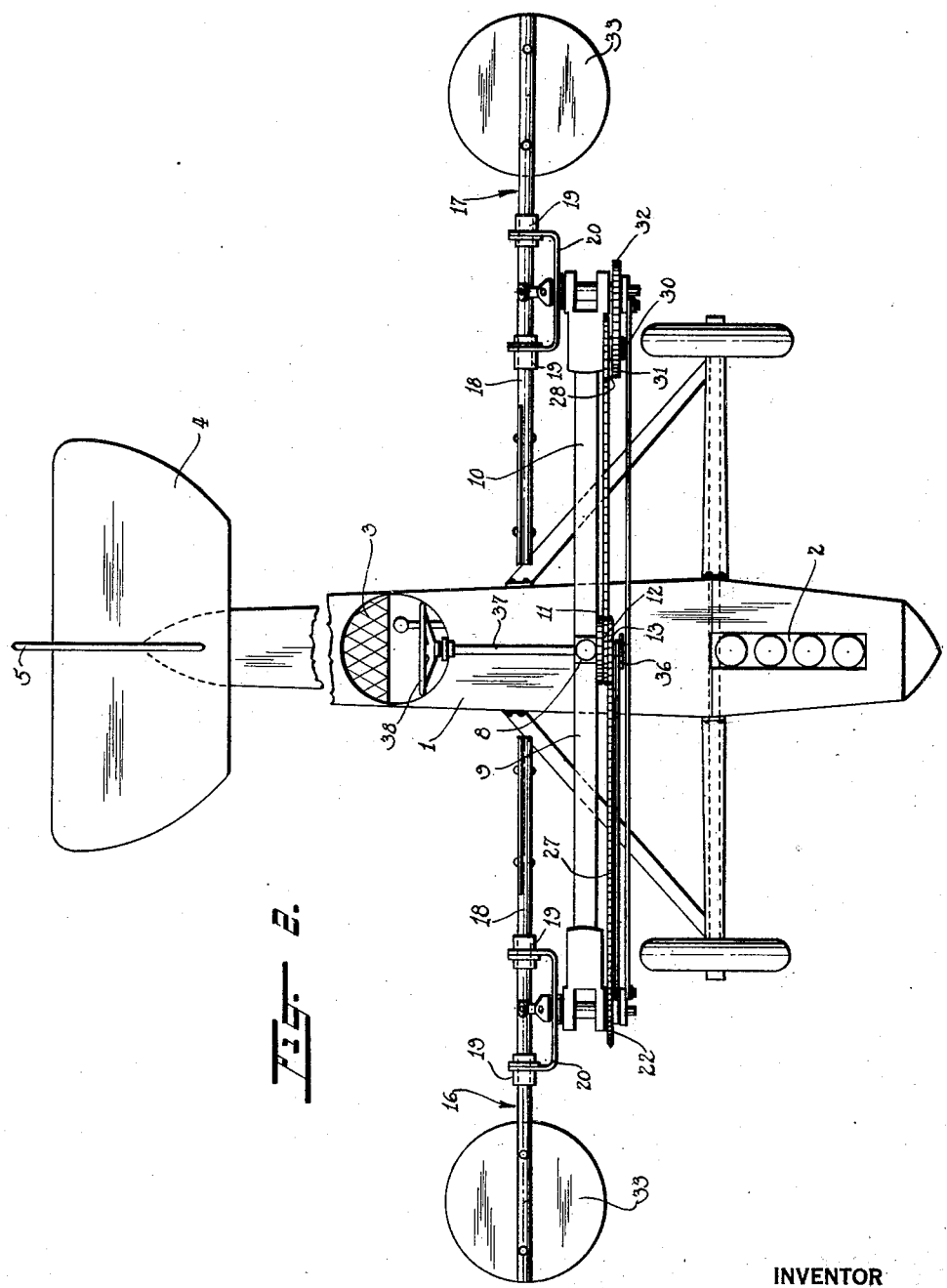

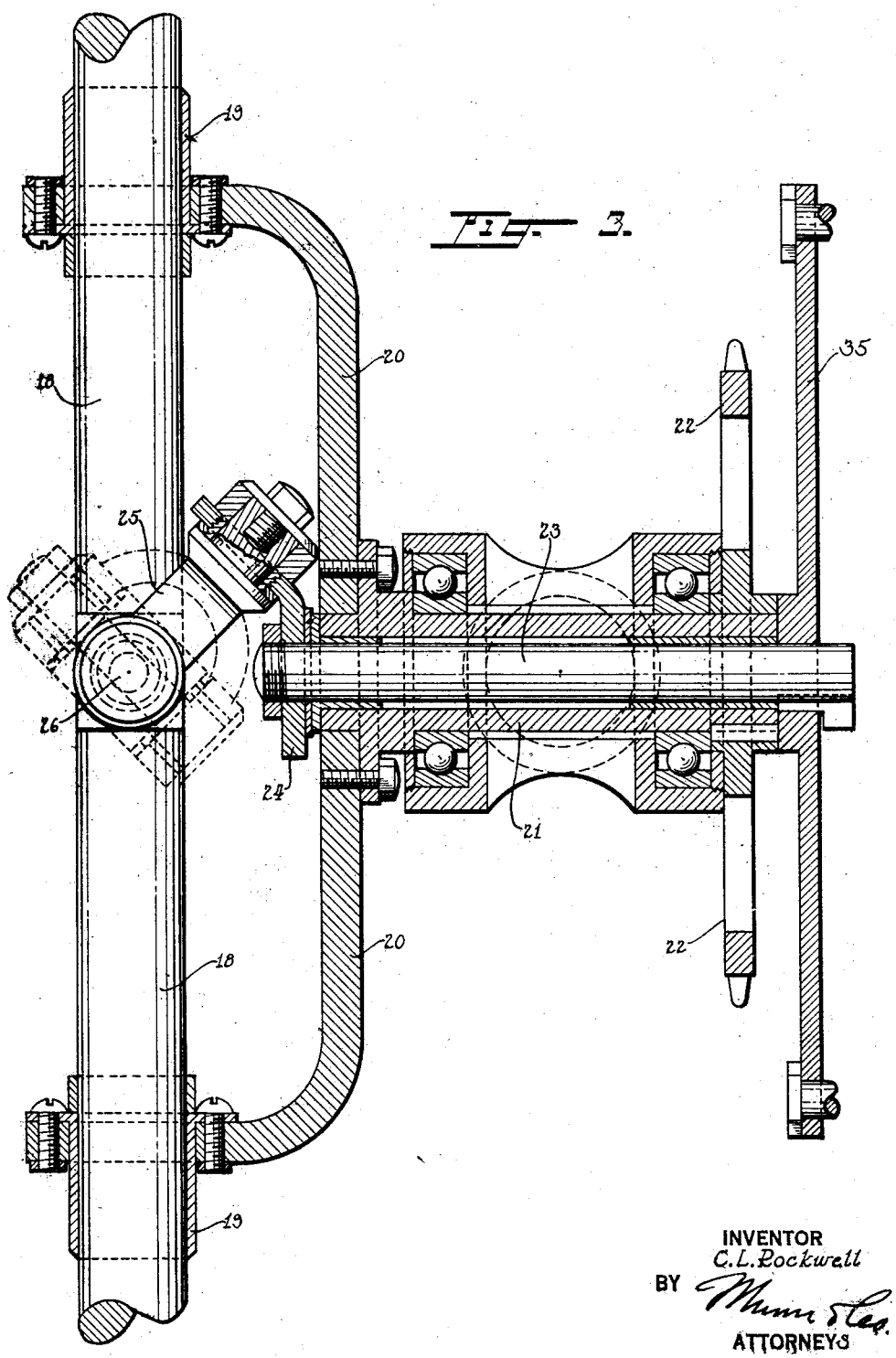

Patented Sept. 2, 1930

1,774,726

UNITED STATES PATENT OFFICE

CHAUNCEY L. ROCKWELL, OF CHICAGO, ILLINOIS

AIRPLANE CONSTRUCTION

Application filed February 23, 1929. Serial No. 342,199.

My invention relates to improvements in airplane constructions, and it consists in the combinations, constructions, and arrangements herein described and claimed.

An object of my invention is to provide an airplane construction which obviates the need of the usual wing construction, and also the ordinary propeller construction.

A further object of my invention is to provide a device of the type described in which the means for propelling the airplane may be actuated so as to cause the propelling means to elevate the airplane and retain the airplane in the elevated position as well as to propel the airplane forwardly.

A further object of my invention is to provide a device of the type described in which the elevating and propelling means may also be adjusted so as to turn the airplane in either direction.

A further object of my invention is to provide a device of the type described in which the connections for actuating the mechanism are made without the need of universal joints or the like.

Other objects and advantages will appear in the following specification, and the novel features of the invention will be particularly pointed out in the appended claims.

My invention is illustrated in the accompanying drawings, forming part of this application, in which Figure 1 is a front elevation of my device,
Figure 2 is a top plan view of my device,
Figure 3 is an enlarged sectional view of a portion of my device, and
Figure 4 is a section along the line 4—4 of Figure 1.

In carrying out my invention, I provide a body portion or fuselage 1 arranged to receive a motor 2 and provided with a cockpit 3. The fuselage is also provided with an elevator 4 and a rudder 5.

The motor 2 is provided with a sprocket wheel 6 which is mounted upon the crankshaft 7. A supporting frame 8 is mounted upon the fuselage 1 and is provided with supporting arms 9 and 10. A series of integral sprocket wheels 11, 12, and 13 is rotatably mounted upon a shaft 14 which is carried by the frame 8. The sprocket wheel 11 is operatively connected to the sprocket wheel 6 by means of a chain 15.

Rotating members 16 and 17 are rotatably carried by the arms 9 and 10, respectively. The mechanism for rotatably securing the members 16 and 17 to the arms 9 and 10 is illustrated in Figure 3. For illustration I will define the construction applied to the member 16, and this description will also apply to the member 17. The members 16 and 17 are provided with rods 18 which are rotatably carried by collars 19 in the ends of U-shaped members 20. The U-shaped members 20 are rigidly secured to sleeves 21 which extend through the ends of the arms 9 and 10. A sprocket wheel 22 is keyed to the sleeve 21 of the member 16. Adjusting shafts 23 extend through the sleeves 21 and are provided with pivot arms 24 which are rigidly secured to the outer ends thereof. The pivot arms 24 are pivotally connected to yokes 25 which extend transversely at 45° angles from the axis of the shaft 23. The yokes 25 are pivotally connected at 26 to the rods 18. The centers of the pivotal connections between the yokes 25 and the rods 18 are in alignment with the center line of the shaft 23.

The sprocket wheel 22 is connected to the sprocket wheel 13 by means of a chain 27. The sprocket wheel 12 is operatively connected to a sprocket wheel 28 by means of a chain 29. The sprocket wheel 28 is rigidly mounted upon a shaft 30 that is pivotally carried by the arm 10. A gear 31 is rigidly mounted upon the shaft 30 and is in mesh with a gear 32 which is keyed to the sleeve 21 of the mechanism for actuating the member 17.

The members 16 and 17 are provided with disc-shaped members 33 which are secured to the outer ends of the rods 18, as shown in Figures 1 and 2. The disc-shaped members 33 of the members 16 and 17 are positioned at right angles with respect to each other. These disc-shaped members are also slightly arcuate shaped in cross section, as shown in Figure 4.

A single actuating arm 34 is rigidly mounted upon the shaft 23 of the member 17.

A double actuating arm 35 is rigidly mounted upon the shaft 23 of the member 16. An actuating lever 36 is rigidly mounted upon a steering column 37 that is rotatably carried by the frame 8. A steering wheel 38 is mounted upon the steering column 37. The actuating lever 36 is operatively connected to the double actuating arm 35 by means of a link 39. The arms 34 and 35 are operatively connected to each other by means of a connecting rod 40.

From the foregoing description of the various parts of the device, the operation thereof may be readily understood. When the motor 2 is in motion, the rotating member 16 will be rotated in a counterclockwise direction, viewing Figure 1, while the rotating member 17 will be rotated in a clockwise direction. The operative connection of the members 16 and 17 with the motor causes these members to rotate in unison.

The mechanism disclosed in Figure 3 causes the rods 18 to be rotated one-fourth revolution in each direction during one revolution of the rotating members. During this rotation of the rods 18 the airplane will be moved forwardly as well as upwardly due to the rapid rotation of the members 16 and 17. As the outermost disc-shaped members move downwardly, they are flat or substantially so, and this movement through the air causes the airplane to be elevated. As the rods 18 are rotated in each direction, the disc-shaped members 33 are positioned so as to impart a forward movement to the airplane. Therefore, during the rotation of the members 16 and 17 and the partial rotation of the rods 18 in the two directions, an upward and a forward movement are imparted to the airplane.

By rotating the steering wheel 38 and the steering column 37, the pilot may vary the positions during the rotation of the members 16 and 17 where the rods 18 are rotated. Rotation of the steering column will impart a rotative movement to the shafts 23. By rotating the shafts 23, the yoke connections between the shafts 23 and the rods 18 are moved with respect to the U-shaped members 20.

Let us assume that the steering wheel and the steering column are rotated in a clockwise direction by the pilot seated in the cockpit. In so doing, the yoke connections 25 will be moved to vary the rotative positions of the rods 18 during the rotation of the rotating members 16 and 17. While the guiding mechanism is in this position, the outer disc of the member 17 will be substantially flat during its movement through the driving path, whereas both discs of the rotating member 16 will be positioned so as to cut the air while passing through their driving paths. By driving path is meant the path through which the disc members 33 pass while in a position to elevate or draw the airplane forwardly.

This unequal positioning of the discs 33 of the two rotating members causes the rotating member 16 to impart a forward and sideward movement to the fuselage while the rotating member 17 imparts an upward movement to the fuselage. Therefore, the rotating member 16 will move the fuselage to the right, looking from the cockpit, while the rotating member 17 will tilt the fuselage to the right. The tilting of the fuselage also aids in turning the airplane due to the cooperation of the elevators. The airplane may be righted so as to move in a straight and horizontal path by actuating the steering wheel to move the guiding or steering mechanism back to its normal position.

The airplane may be turned to the left by turning the steering column to the left and thus actuating the steering mechanism so that the rotating member 16 will tilt the airplane while the rotating member 17 draws the airplane to the left.

Landing gears 41 and a tail skid 42 are provided for the fuselage.

I claim:

1. A device of the type described comprising a fuselage, a frame mounted upon said fuselage, outwardly extending arms carried by the frame, a sleeve rotatably mounted on each arm, a yoke carried by each sleeve, a rod mounted in the arms of each yoke to rotate about the central axis of the rod, blades carried at the ends of said rods, means for rotating the sleeves to cause the revolution of the rods in a plane at right angles to the central axis of the sleeve, and means for causing the rotation of the rods at will.

2. A device of the type described comprising a fuselage, a frame mounted upon said fuselage, outwardly extending arms carried by the frame, a sleeve rotatably mounted on each arm, a yoke carried by each sleeve, a rod mounted in the arms of each yoke to rotate about the central axis of the rod, blades carried at each of the ends of said rods, an adjusting shaft disposed centrally of each adjusting shaft, a yoke secured to said shaft, pivot arms secured to the outer ends of said adjusting shafts, adjusting yokes pivotally connected to said pivot arms at one end and having a pivotal connection with said rods at the other end, and means for causing the rotation of said adjusting shafts whereby the rods are rotated.

3. A device of the type described comprising a fuselage, a frame mounted upon said fuselage, outwardly extending arms carried by the frame, a sleeve rotatably mounted on each arm, a yoke carried by each sleeve, a rod mounted in the arms of each yoke to rotate about the central axis of the rod, blades carried at each of the ends of said rods, an adjusting shaft disposed centrally of each sleeve, a yoke secured to said shaft, pivot arms secured to the outer ends of said adjusting shafts, adjusting yokes pivotally connected to said pivot arms at one end and having a pivotal connection with said rods at the other end, manually operated means for causing the rotation of one of said adjusting shafts to a predetermined distance, and interconnecting means between the adjusting shafts of the sleeves on the oppositely disposed arms for causing the rotation of said shafts simultaneously to the same extent and in opposite directions.

Signed at Chicago in the county of Cook and State of Illinois this 15th day of February A. D. nineteen hundred twenty-nine.

CHAUNCEY L. ROCKWELL.